United States Patent [19]
Meckel et al.

[11] Patent Number: 5,998,538
[45] Date of Patent: Dec. 7, 1999

[54] SOLVENT-FREE, TWO-COMPONENT POLYURETHANE ADHESIVE SYSTEMS

[75] Inventors: Walter Meckel, Neuss; Eduard Hänsel, Langenfeld; Klaus König; Otto Ganster, both of Odenthal; Jörg Büchner, Bergisch Gladbach, all of Germany

[73] Assignee: Bayer Aktiengesellschaft, Leverkusen, Germany

[21] Appl. No.: 08/122,264

[22] Filed: Sep. 16, 1993

[30] Foreign Application Priority Data

Sep. 24, 1992 [DE] Germany .......................... 42 32 015

[51] Int. Cl.$^6$ .............................. C08J 3/00; C08K 3/20; C08L 75/00; C08G 18/00
[52] U.S. Cl. ........................... 524/590; 524/539; 528/44; 528/59; 528/60; 528/66; 528/76; 528/77; 528/80; 528/81; 528/84; 528/85
[58] Field of Search ................................ 524/539, 590; 528/44, 60, 59, 66, 76, 77, 80, 81, 84, 85

[56] References Cited

U.S. PATENT DOCUMENTS

| 3,908,043 | 9/1975 | Evans et al. ............................. 427/203 |
| 3,915,935 | 10/1975 | Abraham et al. .................... 260/75 NP |
| 3,992,316 | 11/1976 | Pedain et al. ........................... 252/182 |
| 4,623,709 | 11/1986 | Bauridedel ................................ 528/65 |
| 4,656,243 | 4/1987 | Pedain et al. ........................... 528/302 |
| 4,692,384 | 9/1987 | Pedain et al. ........................ 428/423.3 |
| 4,935,486 | 6/1990 | Wellner ..................................... 528/67 |
| 5,143,995 | 9/1992 | Meckel et al. ............................ 528/59 |

FOREIGN PATENT DOCUMENTS 4136490 5/1993 Germany .

*Primary Examiner*—Patrick D. Niland
*Attorney, Agent, or Firm*—Joseph C. Gil; Noland J. Cheung

[57] ABSTRACT

The present invention relates to solvent-free two-component polyurethane adhesive systems with high initial strengths and low levels of migration derived from a select reactants comprising a hydroxyl polyester and an isocyanate containing prepolymer.

7 Claims, No Drawings

SOLVENT-FREE, TWO-COMPONENT POLYURETHANE ADHESIVE SYSTEMS

BACKGROUND OF THE INVENTION

There is an increasing trend towards solvent-free coating systems, both on environmental and economic grounds. In order to approach the high level of performance set by current solvent-containing products, many investigations aimed at minimizing the points of weakness of solvent-free coating systems have been performed in recent years. The points of weakness of these systems reside in the difficulty of attaining the requirement of low molecular weight of their components or expressed another way, the points of weakness reside in the difficulty of attaining the requirement of low viscosity, in order to make it possible to dispense without a solvent, and allow further processing of the manufactured article to be performed immediately, in order to dispense with costly storage and inspection of the article.

Criteria which are easy to measure in this context comprise, in particular, the initial loading capacity under stress. This may be described as the initial strength which only permits direct further processing operations to be carried out once it has reached a certain value.

Criteria which are more difficult to assess relate to problems which arise when using compounds of low molecular weight, and which may be summarized under the collective term of migration.

The latter comprises the migration of compounds of low molecular weight from the coating into the environment. Monomeric diisocyanates or possible lower oligomers are regarded as the principal causes of migration.

This migration can lead to the impairment, and in extreme cases even lead to the complete prevention of further processing. Furthermore, very stringent conditions have been prescribed by the legislature, particularly for products which come into contact with foodstuffs. This is because such products, or their decomposition products, capable of migration, can under some circumstances constitute a health hazard.

The manufacture of composite films or foils for the packaging industry is assuming an ever-widening scope, since a composite film or foil with tailored properties can be built by combining different films or foils. Polyurethanes are the preferred adhesives, since they ensure that the films or foils thereof adhere well underneath each other, are odorless and, on account of their transparency, do not result in the visual impairment of the goods to be packaged.

The common two-component systems which are currently used in industry are polyester polyols which are reacted with prepolymers based on diphenylmethane diisocyanate and containing isocyanate groups. Systems such as these provide good initial strengths, but tend to result in increased migration when they are made up incorrectly (e.g. by the use of too much prepolymer).

Systems which provide some progress in this respect have been proposed in EP 150,444 and EP 464,483. However, the prepolymers containing isocyanate groups which are proposed in EP 150,444, or the polyols containing urea groups described in EP 464,483 can only be manufactured with an associated high expenditure. Moreover, products of this composition are often highly viscous; this can lead to difficulties in their subsequent processing under some circumstances. As stated above, there is, therefore, an existing desire in industry for systems which fulfill or approximate the above-mentioned requirements, namely adhesive systems with a high initial strength which are substantially free from migration and yet have as low a viscosity as possible.

The preferred route to attaining these conditions resides in two-component systems which produce on substrates polymeric polyurethane from low molecular weight polyols and polyisocyanates. So as to rapidly achieve the final properties, systems with an overall functionality greater than two are being sought, in order to rapidly obtain a high molecular weight system due to branching.

DESCRIPTION OF THE INVENTION

The present invention accordingly relates to solvent-free, two-component polyurethane systems for the manufacture of composite films or foils with a high initial strength and low levels of migration, based on hydroxyl polyesters (A) and isocyanate group containing prepolymers (B) with a ratio of 1:1.05 to 1:2.0 of hydroxyl groups to free isocyanate groups characterized in that the hydroxyl polyester (A) with a hydroxyl number of 80 to 200 consists of 1) 54 to 58 mole % of a polyol mixture consisting of (i) 70 to 90 mole % of 1,6-hexanediol and (ii) 10 to 30 mole % of at least one higher alcohol selected from the group comprising trimethylolpropane, glycerol, pentaerythritol and mixtures of these polyols, and
2) 42 to 46 mole % of a dicarboxylic acid mixture consisting of (iii) 50 to 80 mole % of isophthalic acid, (iv) 20 to 30 mole % of at least one dicarboxylic acid corresponding to the formula

$$HOOC-(CH_2)_n-COOH$$

(where n is an integer from 2 to 8), and (v) 0 to 20 mole % of at least one dicarboxylic acid or at least one dicarboxylic acid anhydride, selected from the group consisting of terephthalic acid, phthalic acid, phthalic anhydride, tetrahydro- or hexahydrophthalic anhydride, and that the isocyanate group containing prepolymer consists of polyether polyols with an average molecular weight of 400 to 1500, toluene 2,4- or 2,6-diisocyanate or their mixtures, and has a monomer content less than 0.15 weight % and an isocyanate content between 4 and 11 weight %.

The advantages of such a specific composition are surprising, and could by no means have been predicted by one skilled in the art, since even slight changes in the composition of the hydroxyl polyester A, in combination with toluene diisocyanate prepolymers based on polyethers, would normally lead to a drastic reduction of the initial strength, and in part lead to a drastic reduction of the final strength also.

The hydroxyl polyesters which are used according to the invention are prepared in a manner known in the art by methods which are described, for example, in "Ullmanns Enzyklopädie der technischen Chemie", Verlag Chemie Weinheim, 4th Edition (1980), page 61.

Hydroxyl polyesters which are particularly preferred for use are synthesized based on 1,6-hexanediol, trimethylolpropane and isophthalic acid, adipic acid and optionally phthalic acid or phthalic anhydride.

The hydroxyl number should preferably be between 100 and 180, and the acid number should be less than 5, preferably less than 1.5.

Since the two-component systems are always employed with an excess of isocyanate, components containing isocyanate groups are, therefore, present in excess on the completion of the subject reactions. Subsequently, the isocyanate reacts with moisture in the air which is always present and/or with moisture from the substrate. These components can be the cause of migration until the system is finally free from isocyanate. The use of prepolymers containing isocyanate groups with a very low content of monomer is, therefore, an essential requirement for adhesives which are useful in the preparation of composite films or foils which are free from migration.

The prepolymers containing isocyanate groups which are to be used according to the invention, and which have a monomer content less than 0.15 weight %, and preferably less than 0.1 weight %, and an isocyanate content of 4 to 11 weight %, and preferably 5 to 10 weight % may be prepared from polyether polyols and toluene 2,4- or 2,6-diisocyanate or their mixtures by various methods.

The use of a large excess of toluene diisocyanate with a ratio of isocyanate to hydroxyl groups greater than two leads to prepolymers with a high monomer content. However, this can be reduced to values less than 0.15 weight % by distilling off or extracting the excess monomer, in combination with an inert entraining agent under some circumstances. Prepolymers such as these are characterized by particularly low viscosities.

The polyether polyols with molecular weights between 200 and 2000 may be obtained by known methods by the addition of ethylene- and/or propylene oxide, preferably propylene oxide, to starting materials such as water, propylene glycol, 2,2-(bis-4,4-hydroxyphenyl)-propane, trimethylolpropane, glycerol or pentaerythritol, for example. Tetramethylene ether glycols may also be used.

In order to adjust to a preferred range of viscosity and isocyanate content, polyol mixtures are employed which preferably have an average molecular weight of 400 to 1500 and an average functionality of 2.00 to 2.5. Prepolymers with a low monomer content comprising polyols with a molecular weight less than 400 are thus too highly viscous to be processed without problems caused by the high urethane concentration. The upper limit for the average molecular weight of 1500, arises because the isocyanate content is very low, which results in very unfavorable conditions for mixing the isocyanate with the hydroxyl component.

The most preferred prepolymers containing isocyanate groups are those which can be obtained according to DE41 36490 by a particularly simple industrial process from polyether polyol mixtures of average functionality 2.05 to 2.5, preferably 2.06 to 2.25, with at least 90%, preferably 100% secondary hydroxyl groups, and toluene 2,4-diisocyanate with a ratio of isocyanate groups to hydroxyl groups of 1.6 to 1 to 1.8 to 1. The prepolymers containing isocyanate groups are produced in normal stirred vessels; the polyols are added in metered amounts to the diisocyanates at temperatures of 40 to 100° C., preferably 60 to 90° C., and the reaction is allowed to proceed until a constant isocyanate content is obtained.

The prepolymer may subsequently be fed to a thin-film evaporator to remove toluene diisocyanate monomer. However, it may also be advantageous to add water (EP 464,483, EP 340,584), low molecular weight alcohols (DE-OS 2,414,391) or dihydric secondary alcohols (DE 41 364 90) during or after the preparation.

Minor amounts of other hydroxyl compounds, such as castor oil, or polyether esters such as those described in EP 340,586, preferably with the use of 1,6-hexanediol, for example, may be added to the hydroxyl polyesters used according to the invention to obtain special effects; alternatively, up to 10 weight % of triisopropanolamine may be added for the same purpose.

Moreover, modification of the prepolymers containing isocyanate groups used according to the invention cannot be ruled out, as long as the content of free monomer does not increase to a level above 0.15% due to such modification.

Obviously, the mixture of polyol and isocyanate components cannot be stored. As a rule, a mixture prepared by intimate mixing of the reactants remains capable of being processed for 0.25 to 12 hours at 20° C. and at a relative humidity of 50%, depending on the choice of reactants and the stoichiometric ratio of the components in the mixture. Continuous, mechanically-controlled mixing of the two reactants shortly before the time of application to the film or foil is the preferred procedure.

The mixing ratio of the components containing hydroxyl groups and the components containing isocyanate groups depends on the conditions, necessary to obtain the desired composite film or foil, and should be such that the ratio of hydroxyl groups to isocyanate groups is between 1 and 1.05 and 1 to 2.0, preferably between 1 to 1.15 and 1 to 1.7.

Depending on the viscosity of the reactants, mixing may be carried out at an elevated temperature, in order to obtain viscosities which facilitate processing. Processing temperatures up to 100° C. are possible; the preferred processing temperature range is up to 80° C., most preferably from 20 to 50° C.

Solvent-free application of the adhesive mixture is effected by a combination of systems for application, laminating and coiling, such as the "VARICOATER LF" installation manufactured by Windmöller und Hölscher of Lengerich, or the "POLYTEST 440" LF laminating installation manufactured by Polytype of Freiburg, Switzerland.

For further details of the manufacture of composite films or foils, reference is also made to DE-OS 2,549,227, and to the article by H. Hinsken in Kunststoffe 77, 461 (1987).

Depending on the method of application, the type of film or foil and the conditions, e.g. printing inks, the amount of adhesive applied is about 0.8 to 8.0 g adhesive/m$^2$, preferably 1.0 to 4.0 g adhesive/m$^2$.

The mixture may contain reaction accelerators, such as tin (IV) compounds or tertiary amines for example, or fillers or softeners, or internal lubricants and pigments, for example, as auxiliary adhesive technology process materials and/or additives.

It is also possible to add stabilizers, light stabilizers and moisture adsorbents which are known to the person skilled in the art. Bonding agents, such as silanes for example, may also be added to the adhesive to improve certain adhesive properties.

The invention is further illustrated but is not intended to be limited by the following examples in which all parts and percentages are by weight unless otherwise specified.

EXAMPLES

Hydroxyl polyester (A)

A-1 (For use According to the Invention)

A hydroxyl polyester with a hydroxyl number of 163 and an acid number of 1.3 consisting of

| | |
|---|---|
| 3.92 moles 1,6-hexanediol | (30 mole %) |
| 1.00 mole trimethylolpropane | (20 mole %) |
| 2.70 moles isophthalic acid | (70 mole %) |
| 1.17 moles adipic acid | (30 mole %) |

A-2 (For use According to the Invention)

A hydroxyl polyester with a hydroxyl number of 142 and an acid number of 0.8 consisting of

| | |
|---|---|
| 4.00 moles 1,6-hexanediol | (80 mole %) |
| 1.00 mole trimethylolpropane | (20 mole %) |
| 2.50 moles isophthalic acid | (63 mole %) |
| 1.00 moles adipic acid | (25 mole %) |
| 0.50 mole phthalic acid | (12 mole %) |

A-3 (For use According to the Invention)
A hydroxyl polyester with a hydroxyl number of 163 and an acid number of 1.5 consisting of

| | |
|---|---|
| 3.20 moles 1,6-hexanediol | (76 mole %) |
| 1.00 mole trimethylolpropane | (24 mole %) |
| 2.00 moles isophthalic acid | (63 mole %) |
| 1.00 mole adipic acid | (25 mole %) |
| 0.40 mole phthalic acid | (12 mole %) |

A-4 (Not For use According to the Invention))
A hydroxyl polyester with a hydroxyl number of 177 and an acid number of 1.6 consisting of

| | |
|---|---|
| 3.30 moles 1,6-hexanediol | (77 mole %) |
| 1.00 mole trimethylolpropane | (23 mole %) |
| 1.03 moles isophthalic acid | (36 mole %) |
| 1.46 moles adipic acid | (50 mole %) |
| 0.41 mole phthalic acid | (14 mole %) |

A-5 (Not For use According to the Invention))
A hydroxyl polyester with a hydroxyl number of 147 and an acid number of 0.5 consisting of

| | |
|---|---|
| 4.00 moles diethylene glycol | (75 mole %) |
| 1.00 mole trimethylolpropane | (23 mole %) |
| 2.50 moles isophthalic acid | (63 mole %) |
| 1.00 mole adipic acid | (25 mole %) |
| 0.50 mole phthalic acid | (13 mole %) |

A-6
A hydroxyl polyester with a hydroxyl number of 70.5 and an acid number of 0.5 consisting of
1.00 mole polypropylene ether glycol (mol. wt. =1000)
2.00 moles 1,6-hexanediol
2.00 moles phthalic anhydride A-7
A hydroxyl polyester with a hydroxyl number of 112 and an acid number of 0.8 consisting of
1.00 mole adipic acid
1.25 moles neopentyl glycol Prepolymers Containing Isocyanate Groups (B)
B-1 (For use According to the Invention)
A polyol mixture of average functionality 2.1, consisting of

| | |
|---|---|
| 1000 g (1.00 mole) | polypropylene ether glycol (mol. wt. 1000) |
| 145 g (0.67 moles) | polypropylene ether glycol (mol. wt. 216) |
| 81 g (0.18 moles) | polypropylene ether triol (mol. wt. 450) started from trimethylolpropane, |
| was prepolymerized at 70° C with | |
| 2030 g (11.65 moles) | toluene diisocyanate containing 80 weight % of the 2,4- isomer and 20 weight % of the 2,6- isomer. |

The prepolymer, with an isocyanate content of 24.5%, was freed from monomeric toluene diisocyanate by means of a thin-film evaporator.

| | |
|---|---|
| Isocyanate content | 8.8% |
| Monomer content | <0.10% |
| Viscosity | 5000 mPa · s at 50° C. |

B-2 (For use According to the Invention)
A polyol mixture of average functionality 2.2, consisting of

| | |
|---|---|
| 1000 g (1.00 mole) | polypropylene ether glycol (mol. wt. 1000) |
| 93 g (0.43 moles) | polypropylene ether glycol (mol. wt. 216) |
| 158 g (0.36 moles) | polypropylene ether triol (mol. wt. 450) started from trimethylolpropane, |
| was prepolymerized at 70° C. with | |
| 2113 g (12.10 moles) | toluene diisocyanate containing 80 weight % of the 2,4- isomer and 20 weight % of the 2,6- isomer. |

The prepolymer, with an isocyanate content of 24.9%, was freed from monomeric toluene diisocyanate by means of a thin-film evaporator.

| | |
|---|---|
| Isocyanate content | 8.8% |
| Monomer content | <0.10% |
| Viscosity | 5000 mpa · s at 50° C. |

B-3 (For use According to the Invention)
A polyol mixture of average functionality 2.1, consisting of

| | |
|---|---|
| 1000 g (1.00 mole) | polypropylene ether glycol (mol. wt. 1000) |
| 145 g (0.67 moles) | polypropylene ether glycol (mol. wt. 216) |
| 81 g (0.18 moles) | polypropylene ether triol (mol. wt. 450) started from trimethylolpropane, |
| was prepolymerized at 70' C. with | |
| 583 g (3.35 moles) | toluene diisocyanate. |
| Isocyanate content | 6.1% |
| Monomer content | <0.10% |
| Viscosity | 16000 mPa · s at 50° C. |

B-4 (For use According to the Invention)
45,000 g polypropylene ether glycol (mol. wt. 1000) were added to 14,400 g toluene 2,4-diisocyanate at 70° C. and stirred at this temperature until a constant isocyanate content of 5.48% was obtained. 122 g water were added over a period of two hours. The reaction mixture was filled in cans three hours.

| | |
|---|---|
| Isocyanate content | 4.30% |
| Monorner content | <0.10% |
| Viscosity | 8000 mPa · s at 50° C. |

B-5 (Not For use According to the Invention))
1000 g (4.65 moles) polypropylene ether glycol (mol. wt. 215) were reacted at 70° C. with 4775 g (19.1 moles) diphenylmethane diisocyanate.

| | |
|---|---|
| Isocyanate content | 20.5% |
| Monomer content | 45% |

Preparation of Adhesive Mixtures
The polyol components were intensively mixed if necessary, and then mixed with the polyisocyanate component at 40° C. and used immediately. The ratio of isocyanate groups to hydroxyl groups is given as the characteristic number KZ.

| | Polyol component (g) | OH number | Polyisocyanate component (g) | KZ |
|---|---|---|---|---|
| M-1 | 100 A-1 | 163 | 397 B-4 | 140 |
| M-2 | 100 A-2 | 142 | 345 B-4 | 140 |
| M-3 | 100 A-1 5 TIPA* | 197 | 505 B-4 | 140 |
| M-4 | 100 A-2 | 142 | 243 B-3 | 140 |
| M-5 | 100 A-3 | 163 | 428 B-4 | 140 |
| M-6 | 100 A-2 | 142 | 170 B-1 | 140 |
| M-7 | 100 A-2 | 142 | 170 B-2 | 140 |
| M-8 | 75 A-2 25 A-6 | 124 | 224 B-3 | 140 |
| Comparison | | | | |
| M-9 | 100 A-5 | 147 | 257 B-3 | 140 |
| M-10 | 100 A-4 | 177 | 431 B-4 | 140 |
| M-11 | 100 A-7 | 112 | 57 B-5 | 140 |

*TIPA = trisisopropanolamine

M-9 is not in accordance with the invention, since hydroxyl polyester A-5 contains no 1,6-hexanediol.

M-10 is not in accordance with the invention, since hydroxyl polyester A-4 contains too little isophthalic acid.

M-11 is not in accordance with the invention, since the isocyanate group-containing prepolymer B5 has a monomer content of >0.15 weight %.

Selection of the films/foils and composite films/foils cited in the examples—abbreviations used:

ALU: Aluminium foil, 40 μm, laminated on the reflective side
PA: Polyamide film, unstretched, 50 μm
PE: Polyethylene, 50 μm, containing an internal lubricant, metallized,
PETP: Polyester film, 75 μm.
PA/PE=Composite 1
PP/PE=Composite 2
PETP/PE=Composite 3
ALU/PE=Composite 4.
Amount applied=2 to 3 g adhesive per m$^2$.

Test samples were selected from a laminate with a run width of 30 to 100 cm and a length of at least 20 m wound on a reel core. The test samples were cut from the center of the composite film or foil strip after unwinding five wound layers.

Composite strength testing was performed in each case 24 hours and one week after manufacturing the films or foils. From their time of manufacture, the films or foils were stored in an air-conditioned room at 23° C. and 50% relative humidity.

Test Procedure

Strips of laminate, each 15 mm wide, were cut using guillotine shears to a length of about 30 cm with parallel edges. The composites were tested in T-shaped configuration according to DIN 53289, using a VNGG testing machine manufactured by Brugger of Munich, with a pull-off rate of 100 mm/minute over a test length of at least 10 cm.

The results are given in Newtons/15 mm. All the results are mean values of duplicate determinations.

| | Composite 1 24 h/7 d | Composite 2 24 h/7 d | Composite 3 24 h/7 d | Composite 4 24 h/7 d |
|---|---|---|---|---|
| M-1 | 0.9/4.0 | 1.2/9.5+ | 1.2/4.5 | 0.8/2.3 |
| M-2 | 1.2/6.4+ | 1.6/7.8+ | 2.4/4.4 | 1.0/2.5 |
| M-3 | 2.2/5.5 | 2.3/3.6 | 2.9/4.7 | 2.0/2.2 |
| M-4 | 2.0/4.5 | | 1.9/2.6+ | 1.4/2.4 |
| M-5 | 1.0/4.3 | 1.3/3.1 | 1.7/3.2 | 1.6/1.6 |
| M-6 | 2.5/3.4 | | 2.2/4.0+ | 2.5/4.4 |
| M-7 | 3.9/5.0 | | 1.7/4.4+ | 2.5/4.3 |
| M-8 | 1.5/4.3 | | 2.2/3.6+ | 2.0/2.2 |
| Comparison | | | | |
| M-9 | 0.5/5.0 | | 0.2/1.8 | 0.3/2.2 |
| M-10 | 0.2/3.4 | 0.5/3.6 | 0.7/3.5 | 0.2/1.9 |
| M-11 | 3.0/3.5 | 4.8/6.9 | 7.2/6.3+ | 9.0/6.4+ |

+ = film or foil torn off
Mixtures 9 and 10 had initial strengths which were too low.

Migration tests on Composites 1 and 11.

The levels of migration of aromatic polyisocyanates were determined according to the method in paragraph 35 of the LMBG.

The composite foil to be tested was stored as a sample roll in an air-conditioned room at 23° C. and 50% relative humidity. After 1, 2, 3, . . . . 10 days, 10 layers of film or foil run were unwound each time, and two test pieces were taken from each in order to produce test bags (area of contact with the foodstuff=2 dm$^2$).

The test bags were filled with 100 ml of distilled water pre-heated to 70° C., or with 100 ml of 3% acetic acid. They were then weld-sealed and stored at 70° C. for two hours. The bags were emptied immediately after storage and the test foodstuffs were cooled to room temperature.

Polyisocyanates which had migrated were detected by diazotizing the aromatic amines present, followed by coupling with N-(1-naphthyl)ethylenediamine.

For quantitative determination, the extinction values of the coupling components were measured and compared with the corresponding control sample, and the values were converted into μ g aniline hydrochloride/100 ml of test foodstuff by means of a calibration curve.

| | Test foodstuff | | | |
|---|---|---|---|---|
| | Distilled water | | 3% acetic acid | |
| Days | M-4 | M-11 | M-4 | M-11 |
| 1 | 0.50 0.54 | >5 | 0.30 0.30 | >5 |
| 2 | 0.35 0.45 | >5 | nd nd | >5 |
| 3 | 0.21 0.31 | >5 | 0.26 nd | >5 |
| 4 | nd | >5 | nd | >5 |
| 5 | nd | 2.22 2.32 | nd | 3.11 3.12 |
| 6 | nd | 1.91 1.98 | nd | 2.61 2.67 |
| 7 | nd | 1.58 1.66 | nd | 1.24 1.64 |
| 8 | nd | 1.06 1.26 | nd | 1.34 1.37 |
| 9 | nd | 0.88 0.91 | nd | 0.91 1.08 | nd = below the limit of detection

It may be seen that the composites according to the invention were free from migration after three days.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A solvent-free two-component polyurethane adhesive which is useful in the production of composite films or foils with a high initial strength and low levels of migration, based on a hydroxyl polyester (A) and an isocyanate group containing prepolymer (B) with a ratio of hydroxyl groups to free isocyanate groups of 1:1.05 to 1:2.0, characterized in that the hydroxyl polyester (A) with a hydroxyl number of 80 to 200 which consists of 1) 54 to 58 mole % of a polyol mixture consisting of (I) 70 to 90 mole % of 1,6-hexanediol and (ii) 10 to 30 mole % of at least one higher alcohol selected from the group consisting of trimethylolpropane, glycerol, pentaerythritol and mixtures of these polyols, and 2) 42 to 46 mole % of a dicarboxylic acid mixture consisting of (iii) 50 to 80 mole % of isophthalic acid, (iv) 20 to 30 mole % of at least one dicarboxylic acid corresponding to the formula

HOOC—(CH$_2$)$_n$—COOH (where n is an integer from 2 to 8), and (v) 0 to 20 mole % of a dicarboxylic acid or a dicarboxylic acid anhydride, selected from the group consisting of terephthalic acid, phthalic acid, phthalic anhydride, tetrahydro- or hexahydrophthalic anhydride, and characterized in that the isocyanate group containing prepolymer (B) is substantially free of urea groups and consists of polyether polyols with an average molecular weight of 400 to 1500, toluene 2,4- or 2,6-diisocyanate or their mixtures, and has a monomer content less than 0.15 weight % and an isocyanate content between 4 and 11 weight %.

2. A two-component adhesive according to claim 1, characterized in that the hydroxyl polyester (A) is synthesized from 1,6-hexanediol, trimethylolpropane, and isophthalic acid, adipic acid and optionally phthalic acid.

3. A two-component adhesive according to claim 1, characterized in that the isocyanate group containing prepolymer (B) has a monomer content of less than 0.1 weight %.

4. A two-component adhesive according to claim 1, characterized in that the isocyanate group containing prepolymer (B) is synthesized from a polyether polyol mixture with an average functionality of 2.05 to 2.40.

5. A two-component adhesive according to claim 1, characterized in that the isocyanate group containing prepolymer (B) is synthesized from toluene 2,4-diisocyanate.

6. A two-component adhesive according to claim 1, characterized in that the polyether used for the synthesis of the isocyanate group containing prepolymers (B) contains at least 90% of secondary hydroxyl groups.

7. A two-component adhesive according to claim 5, characterized in that the ratio of isocyanate groups to hydroxyl groups in the isocyanate group containing prepolymer (B) is between 1.6:1 and 1.8:1.

\* \* \* \* \*